(12) United States Patent
Xiong et al.

(10) Patent No.: US 9,237,613 B1
(45) Date of Patent: Jan. 12, 2016

(54) CONSTANT CURRENT CONTROL FOR AN LED DRIVER CIRCUIT USING A MICROCONTROLLER-BASED OSCILLATOR CONTROLLED BY A DIFFERENTIAL ERROR FEEDBACK SIGNAL FROM A PROPORTIONAL AND INTEGRATION CONTROL LOOP

(71) Applicant: UNIVERSAL LIGHTING TECHNOLOGIES, INC., Madison, AL (US)

(72) Inventors: Wei Xiong, Madison, AL (US); John J. Dernovsek, Madison, AL (US); Candice Ungacta, Huntsville, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 238 days.

(21) Appl. No.: 14/133,178

(22) Filed: Dec. 18, 2013

Related U.S. Application Data

(60) Provisional application No. 61/738,861, filed on Dec. 18, 2012.

(51) Int. Cl.
| | |
|---|---|
| *H05B 37/00* | (2006.01) |
| *G05F 1/00* | (2006.01) |
| *H05B 33/08* | (2006.01) |
| *H03K 3/012* | (2006.01) |

(52) U.S. Cl.
CPC ............ *H05B 33/0812* (2013.01); *H03K 3/012* (2013.01)

(58) Field of Classification Search
CPC .................................. G05F 1/00; H05B 37/02
See application file for complete search history.

(56) References Cited

U.S. PATENT DOCUMENTS

| | | | | |
|---|---|---|---|---|
| 8,111,014 B2 * | 2/2012 | Van Erp | ............. | H05B 33/0815 315/185 R |
| 9,095,022 B1 * | 7/2015 | Xiong | ................ | H05B 33/0815 |

* cited by examiner

*Primary Examiner* — Hai L Nguyen
(74) *Attorney, Agent, or Firm* — Patterson Intellectual Property Law, P.C.; Mark J. Patterson

(57) ABSTRACT

A constant current driver circuit is operable to provide power to a light source. The driver circuit utilizes a microcontroller based oscillator to drive a current source tank circuit. The microcontroller based oscillator is controlled by a differential error feedback signal. The differential error feedback signal is produced by a proportional integral control loop. The proportional integral control loop is used to eliminate steady state error of the driver circuit. Dynamic frequency or duty cycle control of the current source tank circuit by the microcontroller is based on the integrated error signal between a reference current signal and a sensed output current of the current source tank circuit.

18 Claims, 2 Drawing Sheets

CONSTANT CURRENT CONTROL FOR AN LED DRIVER CIRCUIT USING A MICROCONTROLLER-BASED OSCILLATOR CONTROLLED BY A DIFFERENTIAL ERROR FEEDBACK SIGNAL FROM A PROPORTIONAL AND INTEGRATION CONTROL LOOP

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims priority to and hereby incorporates by reference in its entirety U.S. Provisional Patent Application Ser. No. 61/738,861 entitled "CONSTANT CURRENT CONTROL FOR AN LED DRIVER CIRCUIT USING A MICROCONTROLLER-BASED OSCILLATOR CONTROLLED BY A DIFFERENTIAL ERROR FEEDBACK SIGNAL FROM A PROPORTIONAL AND INTEGRATION CONTROL LOOP" filed on Dec. 18, 2012.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to constant current driver circuits. More particularly, this invention pertains to improving current control stability in constant current driver circuits.

Referring to FIG. 1, a conventional constant current source controller 104 (micro-controller uC) typically needs two signals to maintain a predetermined current level, a current sensing signal (I_sense) and a reference current signal (I_ref_input). A current source tank 102 of the constant current source circuit 100 may be frequency controlled, duty cycle controlled, or other type of current source tank with a control input that is used to adjust the output current of the current source tank 102. A current sensing resistor R_I_sense is in series with a load R_load (e.g., a light source). It is desirable to minimize the resistance value of the current sensing resistor R_I_sense to minimize power consumption by the current sensing resistor R_I_sense. For a wide range of controlled operating output current, the voltage across the current sensing resistor R_I_sense will also be very wide. For example, for an output current range from 1.4 A to 10 mA, the current sensing signal (i.e., voltage) across the current sensing resistor R_I_sense will vary from 0.14V to 0.001V if the resistance of the current sensing resistor R_I_sense is chosen to be 0.1 ohm, a relatively low resistance value to minimize power consumption. Because this voltage signal is relatively small, a current sensing amplifier such as operational amplifier (OPAMP) U1 is used to amplify the signal. A first resistor R1 and a second resistor R2 determine the gain ratio of the OPAMP U1. The gain between the voltage across the current sensing resistor (i.e., I_sense_in) and the current sensing signal I_sense received at the controller 104 is defined in Equation 1.

$$I_{sense} = \frac{R1+R2}{R2} \cdot I_{sense\_in} \quad \text{EQUATION 1}$$

The controller 104 compares the reference current signal (I_ref_input) and current sensing signal I_sense (i.e., current feedback signal) and maintains the output current level set by reference current signal I_ref_input. The control target is given in Equation 2.

$$I_{ref\_input} = I_{sense} = \frac{R1+R2}{R2} \cdot I_{sense\_in} \quad \text{EQUATION 2}$$

The relationship between the reference current signal I_ref_input and the voltage across the current sensing resistor R_I_sense (i.e., I_sense_in) is shown in Equation 3.

$$\frac{I_{ref\_input}}{I_{sense\_in}} = \frac{R1+R2}{R2} \quad \text{EQUATION 3}$$

The controller (microcontroller) 104 uses the difference between I_ref_input and I_sense to adjust the control frequency or duty ratio of a control signal CTRL provided to the current source tank 102 so that the reference current signal I_ref_input matches the current sensing signal I_sense. The frequency control method for adjusting the output current of the current source tank 102 can be simplified as shown in Equation 4.

$$\Delta f = Kf^*(I\_ref\_input - I\_sense) \quad \text{EQUATION 4}$$

In Equation 4, Δf is the change in the frequency of the control signal CTRL, and Kf is the gain of the frequency change rate. The control loop is thus a proportional control loop, and the steady state error cannot be zero. This non-zero steady state error can cause control and output instability. Further, analog to digital conversion error for the reference current signal I_ref_input and the current sensing signal I_sense can also cause output instability, particularly when the reference current signal I_ref_input and the current sensing signal I_sense are small (i.e., dimmed operation or a relatively low power mode).

BRIEF SUMMARY OF THE INVENTION

Aspects of the present invention provide a constant current driver circuit operable to provide power to a light source. The driver circuit utilizes a microcontroller based oscillator controlled by a differential error feedback signal produced by a proportional integral control loop to control output current of a current source tank. A proportional integral control loop is used to make the steady state error of the driver circuit control loop zero. Dynamic frequency control of the current source tank by the microcontroller is based on the integrated error signal between the reference current signal I_ref_input and the current sensing signal I_sense.

In one aspect, a constant current driver circuit includes a current source tank circuit, and a controller, and output current sensing circuit, and a differential error circuit. The current source tank circuit receives power from a power source and provides an output current to a load as a function of a control signal. The controller has a circuit ground, and error signal input, and a control signal output. The control signal output provides the control signal to the current source tank circuit. The controller adjusts the control signal as a function of an error signal received at the error signal input. The error signal is referenced to the circuit ground. The output current sensing circuit senses the output current provided by the current source tank circuit to the load and provides an amplified current sensing signal indicative of the sensed output current provided to the load. The differential error circuit has an output current sensing input, and a reference current input. The differential error circuit receives the amplified current sensing signal from the output current sensing circuit at the output current sensing input of the differential error circuit. The differential error circuit receives a reference current signal at the reference current input of the differential error circuit. The differential error circuit determines a difference between the received amplified current sensing signal and the received reference current signal. The differential error circuit provides the error signal to the error signal input of the controller.

In another aspect, a light fixture includes a light source, a constant current driver circuit, and a housing. The housing supports the light source and the constant current driver circuit. The light source provides light in response to receiving power. The constant current driver circuit provides power to the light source. The constant current driver circuit includes a current source tank circuit, a controller, an output current sensing circuit, and a differential error circuit. The current source tank circuit receives power from a power source and provides an output current to the light source as a function of a control signal. The controller has a circuit ground, an error signal input, and a control signal output. The control signal output provides the control signal to the current source tank circuit. The controller adjusts the control signal as a function of an error signal received at the error signal input. The error signal is referenced to the circuit ground. The output current sensing circuit senses the output current provided by the current source tank circuit to the light source and provides an amplified current sensing signal indicative of the sensed output current provided to the light source. The differential error circuit has an output current sensing input, and a reference current input. The differential error circuit receives the amplified current sensing signal from the output current sensing circuit at the output current sensing input of the differential error circuit. The differential error circuit receives a reference current signal at the reference current input of the differential error circuit. The differential error circuit determines a difference between the received amplified current sensing signal and the received reference current signal. The differential error circuit provides the error signal to the error signal input of the controller.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids. Further, "connected between" or "connected to" means electrically connected when referring to electrical devices in circuit schematics or diagrams.

Figure 2:
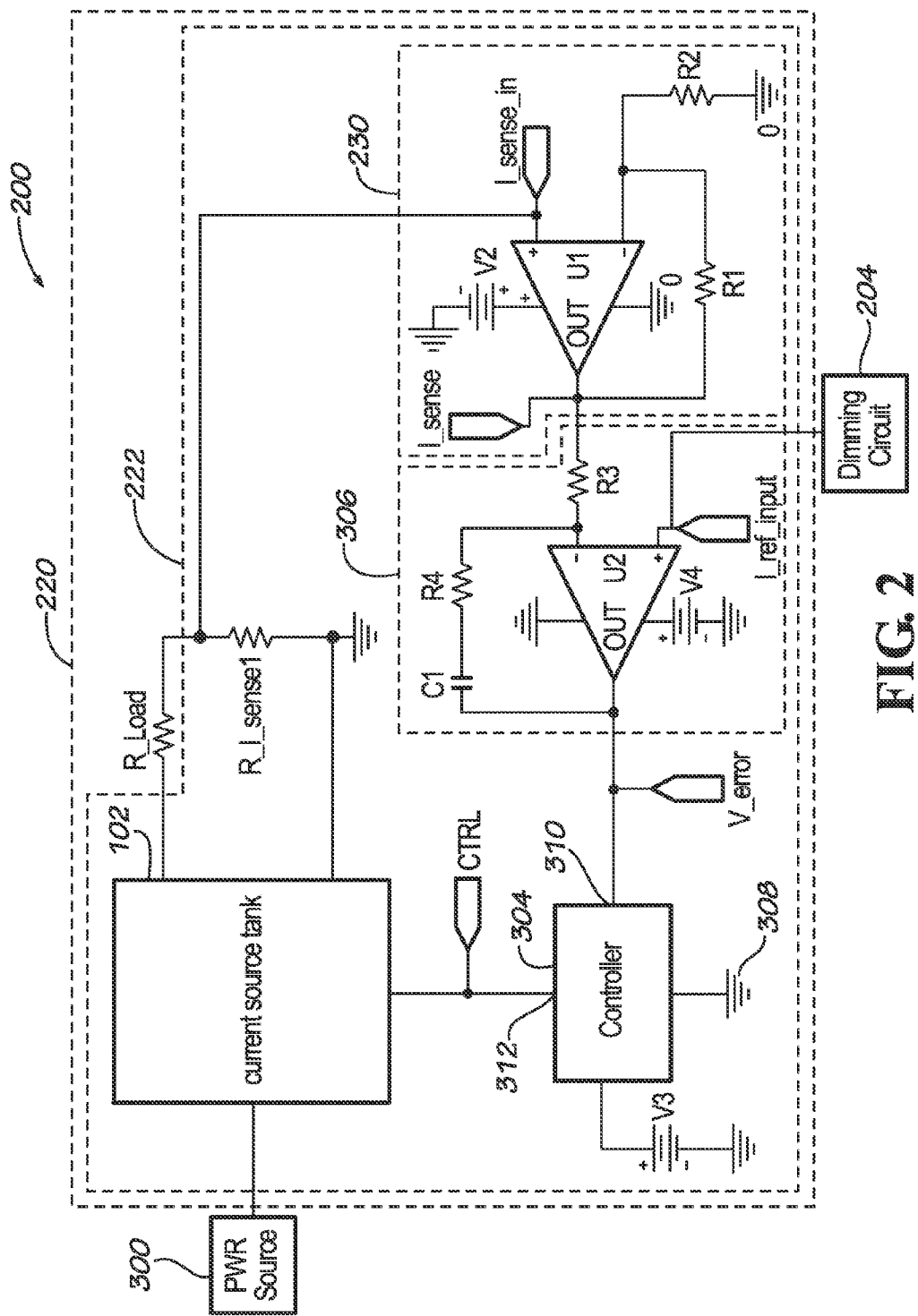
FIG. 2 is a partial schematic and block diagram of a light fixture including a constant current driver circuit with a proportional integral control loop providing power to a light source of the light fixture.

Referring to FIG. 2, a light fixture 200 includes a housing 220, a light source R_load (i.e., a load), and a constant current driver circuit 222. The housing 220 supports the light source R_load and the driver circuit 222. The light source R_load provides light in response to receiving power (e.g., an output current) from the driver circuit 222. It is contemplated that loads other than light sources may be used with the driver circuit 222, and the driver circuit 222 may be used without the housing 220 or in a housing other than a light fixture housing.

The constant current driver circuit 222 includes the current source tank circuit 102, a controller 304, an output current sensing circuit 230, and a differential error circuit 306. The current source tank circuit 102 receives power from a power source 300 and provides an output current to the load R_load as a function of a control signal. The current source tank circuit 102 may be any current output circuit such as a frequency or duty cycle controlled inverter and resonant tank circuit as known in the art.

The controller 304 has a circuit ground 308, an error signal input 310 (V_error), and a control signal output 312 (CTRL). The control signal output 312 provides the control signal CTRL to the current source tank 102. The controller 304 adjusts the control signal CTRL as a function of an error signal V_error received at the error signal input 310. In one embodiment, the error signal V_error is a voltage signal referenced to the circuit ground 308. In one embodiment, the controller 304 determines a change to the control signal CTRL by determining a difference between the error signal V_error and a predetermined error set point and multiplying the difference by a gain constant. In one embodiment, the predetermined error set point is a fixed constant (e.g., one-half the bias voltage V3 of the controller 304).

The output current sensing circuit 230 senses the output current provided by the current source tank circuit 102 to the load R_load and provides an amplified current sensing signal I_sense indicative of the sensed output current provided to the load R_load. In one embodiment, the output current sensing circuit 230 varies the amplified current sensing signal I_sense from a voltage of the circuit ground 308 to a voltage of a bias voltage V4 of differential error circuit 306. In one embodiment, the driver circuit 222 further includes a current sensing resistor R_I_sense 1 connected between the light source R_load and the circuit ground 308. In one embodiment, the output current sensing circuit 230 includes a first operational amplifier U1, a first resistor R1, and a second resistor R2. The first operational amplifier U1 has an inverting input, a non-inverting input, and an output. The non-inverting input is connected to the current sensing resistor R_I_sense 1 and the light source R_load. The output of the first operational amplifier U1 is connected to the differential error circuit 306. The first resistor R1 is connected between the inverting input and the output of the first operational amplifier U1. The second resistor R2 is connected between the inverting input of the first operational amplifier U1 and the circuit ground 308. In one embodiment, the output current sensing circuit 230 varies a voltage of the amplified current sensing signal I_sense from a voltage of the circuit ground 308 to a bias voltage V2 of the output current sensing circuit 230. In one embodiment, the voltage of the amplified current sensing signal I_sense is further limited to be less than a bias voltage V4 of the differential error circuit 306. The bias voltage of the output current sensing circuit 230 and the bias voltage V4 of the differential error circuit 306 may be the same or different.

The differential error circuit 306 has an output current sensing input and a reference current input. The differential error circuit 306 receives the amplified current sensing signal I_sense from the output current sensing circuit 230 at the output current sensing input of the differential error circuit 306. The differential error circuit 306 receives a reference current signal I_ref_input at the reference current input of the differential error circuit 306. The differential error circuit 306 determines the difference between the received amplified current sensing signal I_sense and the received reference current signal I_ref_input. The differential error circuit 306 provides the error signal V_error to the error signal input 310 of the controller 304. In one embodiment, a voltage of the error signal V_error varies from a voltage of the circuit ground 308 to a bias voltage V3 of the controller 304. In one embodiment, the differential error circuit 306 includes a second operational amplifier U2, a third resistor R3, a fourth resistor R4, and a capacitor C1. The second operational amplifier U2 has an output, and inverting input, and a non-inverting input. The inverting input of the second operational amplifier U2 receives the reference current signal I_ref_input. The third resistor R3 is connected between the inverting input the second operational amplifier U2 and an output of the output current sensing circuit 230 to receive the amplified current sensing signal I_sense at the differential error circuit 306. The capacitor C1 is connected in series with the fourth resistor R for between the inverting input of the second operational amplifier U2 and the output of the second operational amplifier U2. In one embodiment, the differential error circuit 306 varies a voltage of the error signal V_error from a voltage of the circuit ground 308 to the bias voltage V4 of the differential error circuit 306. In one embodiment, the voltage of the error signal V_error is further limited to be less than the bias voltage V3 of the controller 304. In one embodiment, the bias voltage V4 of the differential error circuit 306, and the bias voltage V2 of the output current sensing circuit 230 are the same (e.g., a common bias voltage circuit of the driver circuit 222).

In one embodiment, the light fixture further includes a dimming circuit 204 that receives an input selecting a dimming level. The dimming circuit 204 provides the reference current signal I_ref_input to the differential error circuit 306 as a function of the selected dimming level. The dimming level may be selected by a dimming controller or by a user.

Figure 1:
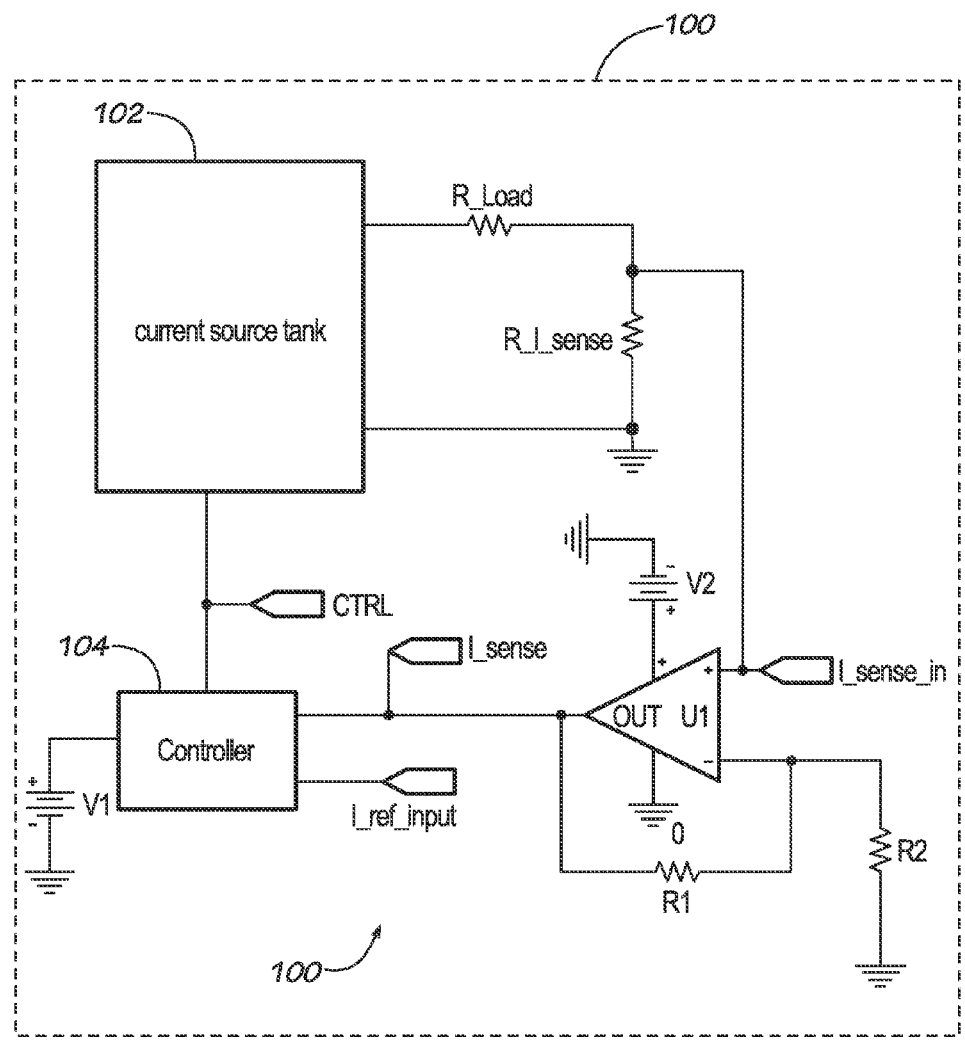
FIG. 1 is a partial schematic and block diagram of a prior art constant current driver circuit providing power to a load.

The driver circuit 222 implements a proportional integral control loop via a controller 304, current source tank 102, output current sensing circuit 230, and differential error circuit 306. In FIG. 2, the first OPAMP U1 has the same function as the OPAMP U1 shown in FIG. 1 which is to amplify the sensed output current signal I_sense_in. The ratio between the sensed output current signal I_sense and the amplified current sensing signal I_sense_in is defined above in Equation 1. In the driver circuit 222 of FIG. 2, a second OPAMP U2 is used to accomplish proportional and integration control (PI control). When properly configured, the control loop can provide a zero steady state error between the reference current input I_ref_input and the amplified current sensing signal I_sense. The third resistor R3, fourth resistor R4, and capacitor C1 are components that determine operation of the PI control loop. The error signal V_error is the output of the PI control loop. The controller 304 senses the output of the PI control loop V_error and uses changes in the error signal V_error to control the frequency or duty cycle change of the control signal CTRL provided to the current source tank circuit 102. The control method executed by the controller 304 is defined by Equation 5.

$$\Delta f = Kf * \Delta V\_error = Kf(V\_error - V\_setpoint) \qquad \text{EQUATION 5}$$

In Equation 5, $\Delta V\_error$ is the change in V_error from one sample by the controller 304 to the next. Kf is the gain constant of the frequency change rate, a predetermined constant set within the control program executed by the controller 304. V_error_setpoint is the control point of the error signal (e.g., half the bias voltage V3 of the controller 304. The control point (i.e., set point) of error signal V_error_setpoint could be chosen as any point as long as it is greater than the voltage of the circuit ground 308 and less than the bias voltage V3 of the controller 304.

Because the output is controlled by PI control loop, analog to digital conversion error by the controller 304 for the error signal V_error will not affect the output steady state value. The analog to digital conversion error by the controller 304 for the error signal V_error will only affect the frequency (or duty cycle) change rate of the control signal CTRL. If the controller 304 performs analog to digital conversion fast enough, the output change due to the frequency change (or duty cycle change) will not have any low frequency ripple, which is not easily filtered out by a simple LC (inductive capacitive) filter network. Thus, the controller 304 generally functions as an oscillator controlled by the differential error feedback signal V_error coming from the PI control loop. This method effectively eliminates steady state error and output instability caused by controller 304 analog to digital conversion error and dramatically simplifies the ASIC or firmware design of the controller 304.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server will generally include an edge server, a plurality of data servers, a storage database (e.g., a large scale RAID array), and various networking components. It is contemplated that these devices or functions may also be implemented in virtual machines and spread across multiple physical computing devices.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful CONSTANT CURRENT CONTROL FOR AN LED DRIVER CIRCUIT USING A MICROCONTROLLER-BASED OSCILLATOR CONTROLLED BY A DIFFERENTIAL ERROR FEEDBACK SIGNAL FROM A PROPORTIONAL AND INTEGRATION CONTROL LOOP it is not intended that such references be construed as limitations upon the scope of this invention except as set forth in the following claims.

What is claimed is:

1. A constant current driver circuit comprising:
a current source tank circuit configured to receive power from a power source and provide an output current to a load as a function of a control signal;
a controller having a circuit ground, an error signal input, and a control signal output, wherein
the control signal output is configured to provide the control signal to the current source tank circuit, and
the controller is configured to adjust the control signal as a function of an error signal received at the error signal input, wherein the error signal is referenced to the circuit ground;
an output current sensing circuit operable to sense the output current provided by the current source tank circuit to the load and provide an amplified current sensing signal indicative of the sensed output current provided to the load; and
a differential error circuit having an output current sensing input and a reference current input, wherein the differential error circuit is configured to
receive the amplified current sensing signal from the output current sensing circuit at the output current sensing input,
receive a reference current signal at the reference current input; and
determine a difference between the received amplified current sensing signal and the received reference current signal, and
provide the error signal to the error signal input of the controller.

2. The constant current driver circuit of claim 1, wherein the differential error circuit is operable to vary a voltage of the error signal from a voltage of the circuit ground to a bias voltage of the differential error circuit.

3. The constant current driver circuit of claim 1, wherein the output current sensing circuit is operable to vary a voltage of the amplified current sensing signal from a voltage of the circuit ground to a bias voltage of the output current sensing circuit.

4. The constant current driver circuit of claim 1, wherein
the constant current driver circuit further comprises a current sensing resistor connected between the load and the circuit ground; and
the output current sensing circuit comprises
a first operational amplifier having an inverting input, a non-inverting input, and an output, wherein the non-inverting input is connected to the current sensing resistor and the load and the output is connected to the differential error circuit,
a first resistor connected between the inverting input and the output of the first operational amplifier, and
a second resistor connected between the inverting input of the first operational amplifier and the circuit ground.

5. The constant current driver circuit of claim 1, wherein the differential error circuit comprises:
a second operational amplifier having an output, an inverting input, and a non-inverting input, wherein the inverting input is configured to receive the reference current signal;
a third resistor connected between the inverting input of the second operational amplifier and an output of the output current sensing circuit to receive the amplified current sensing signal at the differential error circuit;
a fourth resistor; and
a capacitor connected in series with the fourth resistor between the inverting input of the second operational amplifier and the output of the second operational amplifier.

6. The constant current driver circuit of claim 1, wherein:
the controller determines a change to the control signal by determining a difference between the error signal and a predetermined error setpoint, wherein the predetermined setpoint is a fixed constant, and
multiplying the difference by a gain constant.

7. The constant current driver circuit of claim 1, wherein the controller, output current sensing circuit, and differential error circuit implement a proportional integral control loop for the output current provided to the load.

8. The constant current driver circuit of claim 1, wherein:
a voltage of the amplified current sensing signal has a range between a voltage of the circuit ground and a bias voltage of the differential error circuit; and
a voltage of the error signal has a range between circuit ground and a bias voltage of the controller.

9. A light fixture comprising:
a light source operable to provide light in response to receiving power;
a constant current driver circuit configured to provide power to the light source, said constant current driver circuit comprising
a current source tank circuit configured to receive power from a power source and provide an output current to a light source as a function of a control signal,
a controller having a circuit ground, an error signal input, and a control signal output, wherein
the control signal output is configured to provide the control signal to the current source tank circuit via the control signal output, and
the controller is configured to adjust the control signal as a function of an error signal received at the error signal input, wherein the error signal is referenced to the circuit ground;
an output current sensing circuit operable to sense the output current provided by the current source tank circuit to the light source and provide an amplified current sensing signal indicative of the sensed output current provided to the light source; and
a differential error circuit having an output current sensing input and a reference current input, wherein the differential error circuit is configured to
receive the amplified current sensing signal from the output current sensing circuit at the output current sensing input,
receive a reference current signal at the reference current input, determine a difference between the received amplified current sensing signal and the received reference current signal, and
provide the error signal to the error signal input of the controller.

10. The light fixture of claim 9, wherein the differential error circuit is operable to vary a voltage of the error signal from a voltage of the circuit ground to a bias voltage of the differential error circuit.

11. The light fixture of claim 9, wherein the output current sensing circuit is operable to vary a voltage of the amplified current sensing signal from a voltage of the circuit ground to a bias voltage of the output current sensing circuit.

12. The light fixture of claim 9, wherein:
the constant current driver circuit further comprises a current sensing resistor connected between the light source and the circuit ground; and
the output current sensing circuit comprises
a first operational amplifier having an inverting input, a non-inverting input, and an output, wherein the non-inverting input is connected to the current sensing resistor and the light source and the output is connected to the differential error circuit,
a first resistor connected between the inverting input and the output of the first operational amplifier, and
a second resistor connected between the inverting input of the first operational amplifier and the circuit ground.

13. The light fixture of claim 9, wherein the differential error circuit comprises:
a second operational amplifier having an output, an inverting input, and a non-inverting input, wherein the inverting input is configured to receive the reference current signal;
a third resistor connected between the inverting input of the second operational amplifier and an output of the output current sensing circuit to receive the amplified current sensing signal at the differential error circuit;
a fourth resistor; and
a capacitor connected in series with the fourth resistor between the inverting input of the second operational amplifier and the output of the second operational amplifier.

14. The light fixture of claim 9, wherein:
the controller determines a change to the control signal by determining a difference between the error signal and a predetermined error setpoint, wherein the predetermined setpoint is a fixed constant, and
multiplying the difference by a gain constant.

15. The light fixture of claim 9, wherein the controller, output current sensing circuit, and differential error circuit implement a proportional integral control loop for the output current provided to the light source.

16. The light fixture of claim 9, wherein:
a voltage of the amplified current sensing signal has a range between a voltage of the circuit ground and a bias voltage of the differential error circuit; and a voltage of the error signal has a range between circuit ground and a bias voltage of the controller.

17. The light fixture of claim 9, further comprising a dimming circuit operable to receive input selecting a dimming level and provide the reference current signal to the differential error circuit as a function of the selected dimming level.

18. The light fixture of claim 9, further comprising a housing configured to support the light source and the constant current driver circuit.

* * * * *